(12) United States Patent
Kelly

(10) Patent No.: US 9,573,526 B2
(45) Date of Patent: Feb. 21, 2017

(54) MIRROR BRACKET FOR A MOTOR VEHICLE

(71) Applicant: Quadratec, Inc., West Chester, PA (US)

(72) Inventor: Thomas N. Kelly, Hydes, MD (US)

(73) Assignee: Quadratec, Inc., West Chester, PA (US)

( * ) Notice: Subject to any disclaimer, the term of this patent is extended or adjusted under 35 U.S.C. 154(b) by 276 days.

(21) Appl. No.: 13/798,705

(22) Filed: Mar. 13, 2013

(65) Prior Publication Data

US 2014/0268379 A1    Sep. 18, 2014

(51) Int. Cl.
 B60R 1/078  (2006.01)
 B60R 1/06  (2006.01)

(52) U.S. Cl.
 CPC .......... B60R 1/078 (2013.01); B60R 1/06 (2013.01); *Y10T 29/49959* (2015.01)

(58) Field of Classification Search
 CPC .............. B60J 1/20; B60J 5/0404; B60R 1/06; B60R 1/078

USPC ................... 359/838–884, 265–276
 See application file for complete search history.

(56) References Cited

U.S. PATENT DOCUMENTS

| 6,672,726 | B1 * | 1/2004 | Boddy ................ B60R 1/078 359/841 |
| 7,350,931 | B1 * | 4/2008 | Peterson et al. ............. 359/841 |
| 2005/0213232 | A1 * | 9/2005 | Englander ..................... 359/879 |
| 2010/0214680 | A1 * | 8/2010 | Maxwell et al. ............. 359/841 |

FOREIGN PATENT DOCUMENTS

GB           2075117 A    * 11/1981    ............... E05F 5/14

* cited by examiner

*Primary Examiner* — Scott J Sugarman
*Assistant Examiner* — Sharrief Broome
(74) *Attorney, Agent, or Firm* — Caesar Rivise, PC

(57) ABSTRACT

A mirror bracket supports a mirror. A mirror bracket includes a base and an attachment member for attaching the base to a vehicle. A member moves relative to the base. The member is movable in a rotational or linear direction. The member is urged opposite to the rotational or linear direction. The member includes a mirror receiver where the mirror is coupled to the member.

25 Claims, 14 Drawing Sheets

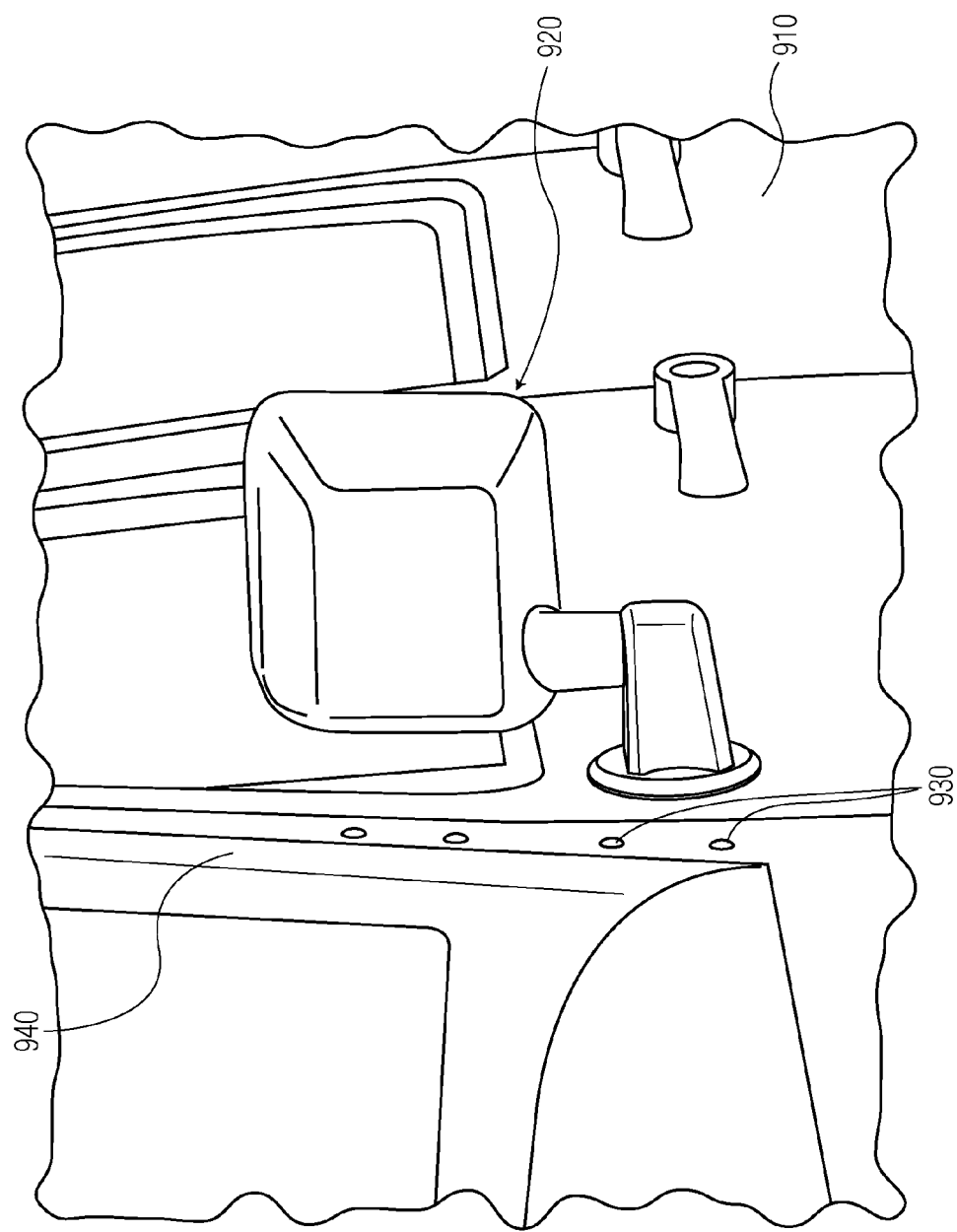

MIRROR BRACKET FOR A MOTOR VEHICLE

FIELD OF THE INVENTION

The present invention relates to a mirror bracket and, more in particular, a mirror bracket for use with a motor vehicle. Specifically, a mirror bracket is disclosed that moves.

BACKGROUND OF THE INVENTION

FIG. 10 illustrates a perspective view of the driver side of a motor vehicle. As shown, the motor vehicle includes driver door 910. A mirror assembly 920 is attached to door 910. In FIG. 10, the figure shows a vehicle from a position slightly forward of the driver and on the driver side of the vehicle. Thus, a mirror (not shown) sits inside mirror assembly 920 and is visible to the driver of the vehicle. A driver sitting in the driver seat of the vehicle is able to look into the mirror. By looking into the mirror, the driver is able to see behind the driver and along the driver side of the vehicle.

On the other side of the vehicle (the side of the vehicle closest to where a passenger, sitting next to where the driver is located), another mirror assembly may be located. Inclusion of a mirror assembly on the passenger side of the vehicle may be optional. The mirror assembly on the passenger side of the vehicle is a mirror image of the mirror assembly on the driver side of the vehicle. The mirror assembly on the passenger side of the vehicle also is visible to the driver of the vehicle. By looking into the mirror, the driver is able to see along the passenger side of the vehicle.

As shown in FIG. 10, mirror assembly 920 may be rigidly attached to door 910. Thus, mirror assembly 920 moves with door 910. As door 910 is opened and closed, door 910 will swivel relative to the vehicle. As door 910 swivels, mirror 920 moves with door 910.

SUMMARY OF THE INVENTION

A mirror bracket supports a mirror. The mirror bracket includes a first portion which is attachable to the vehicle; a second portion which moves relative to said first portion and which supports said mirror; the second portion moves about a first axis in a first rotational direction or along a second axis in a first linear direction while said first portion remains stationary responsive to a door opening; the second portion moves in a second rotational direction opposite the first rotational direction or in a second linear direction opposite to the first linear direction responsive to the door closing; the second portion is pivotable about the first axis or movable along the second axis independent of the door opening or closing.

BRIEF DESCRIPTION OF THE DRAWINGS

FIG. 10 shows a motor vehicle with a prior art mirror bracket and mirror.

DETAILED DESCRIPTION OF EXEMPLARY EMBODIMENTS OF THE PRESENT INVENTION

Figure 1:
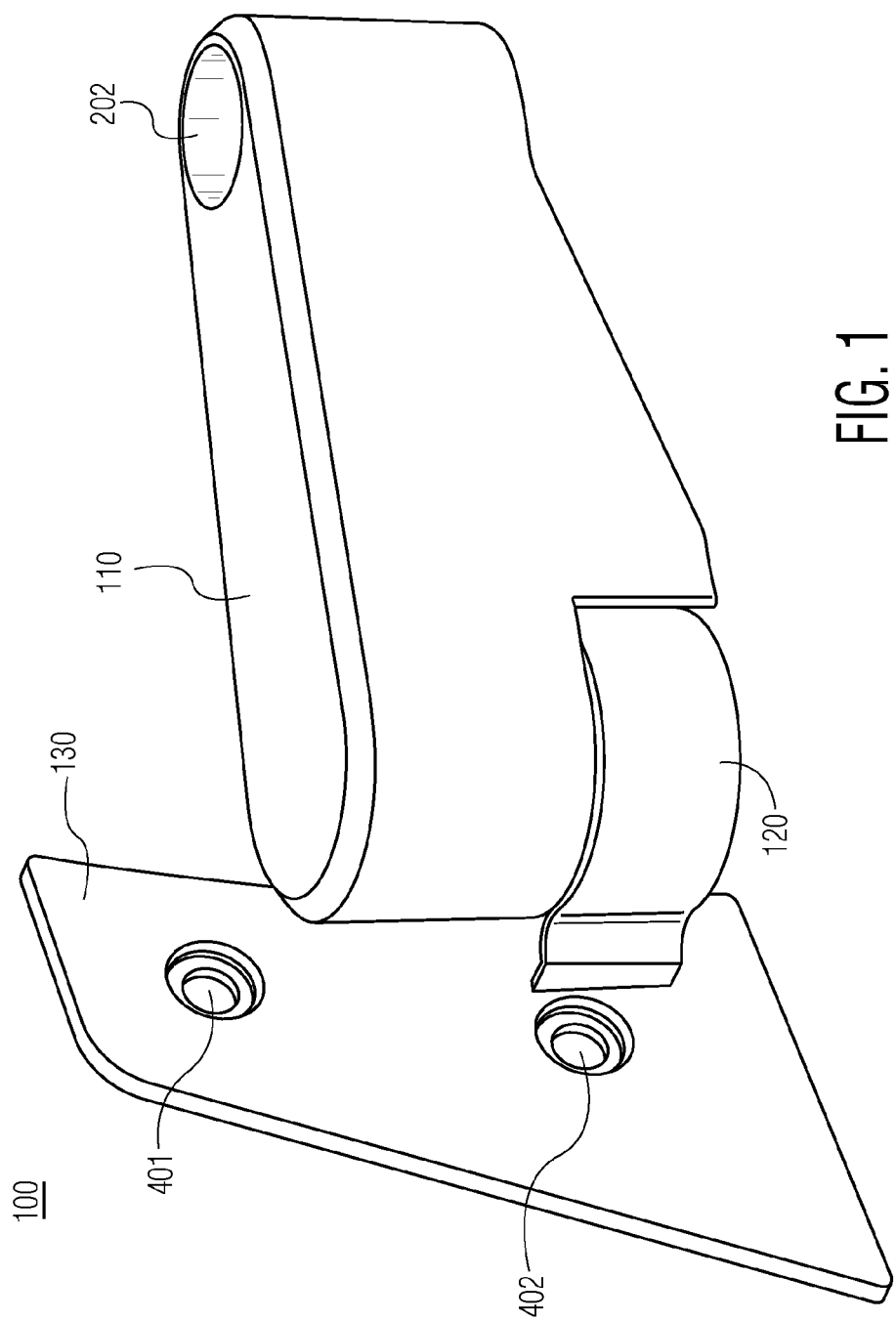
FIG. 1 shows a perspective view of a mirror bracket in accordance with a first exemplary embodiment of the present invention.

Again referring to FIG. 10, a problem may be created if, for example, the owner of a vehicle decides to remove doors 910. There are some situations where it is desirable to drive a vehicle without the doors in place. This may occur, for example, if the vehicle is being driven off of a public road. For example, if someone is driving a vehicle on a beach, it might be fun to drive the vehicle without the doors. Thus, some users desire to be able to remove the doors from the vehicle. As doors are typically attached to a vehicle by way of a hinge, it may be a simple matter to remove the pin from the hinge so that the door can be easily removed. Furthermore, while it may be fun to remove the door from the vehicle, it is also desirable to be able to reinstall the door back onto the vehicle at a later time. For example, driving down a highway, a vehicle owner would typically desire that the doors be installed on the vehicle. Once the owner of the vehicle brings the vehicle to a beach, the owner of the vehicle may desire to remove the doors from the vehicle. After spending an enjoyable day at the beach, the vehicle owner may wish to drive the vehicle home on the highway, and may thus desire to put the doors back onto the vehicle.

As shown in FIG. 10, because mirror assembly 920 is attached to door 910, once door 910 is removed, mirror assembly 920 is also removed. This can be inconvenient to the driver of the vehicle because side view from the driver seat has been eliminated. Drivers may wish to have a side view even after the door has been removed.

One solution that has been proposed to deal with this problem is to use bolts 930 to affix a mirror assembly to the vehicle. Thus, for example, bolts 930 can be unscrewed and some type of mirror assembly can be attached to the vehicle using bolts 930. By attaching the mirror assembly to the vehicle using bolts 930, the mirror assembly is attached to the vehicle regardless of whether or not door 910 is attached to the vehicle. The location of bolts 930, however, may be very inconvenient for attaching mirror fixture to a vehicle. Because bolts 930 are more towards the front of the vehicle then where mirror assembly 920 is normally attached to the door, the location of the mirror may be very inconvenient. In addition to the mirror being further away from the driver then where it is typically located when it is attached to the door, the frame around the front windshield may obstruct the driver's view. Thus, for example, A-pillar 940 can obstruct the driver's view of the mirror when mirror fixture 920 is attached to the vehicle using bolts 930.

Thus, it would be desirable if a mirror can be located in the position where it is located in FIG. 10 without being directly attached to the door.

An overview of exemplary embodiments of the present invention is now provided. This overview is for explanatory purposes only and should not be construed as limiting the scope of the claims invention. In an exemplary embodiment of the present invention, it is desirable to be able to position a mirror in the position it appears in FIG. 10 regardless of whether or not the door is attached to the vehicle. As bolts 940 provide a convenient attachment point, it is desirable to provide a mirror bracket that has an arm of sufficient length so that a) it is attached to the vehicle at a location other than the door; and b) the arm maintains the mirror in a location where it can be seen by the driver. If such a mirror bracket is provided, there is a concern that if the driver side door is opened and closed, then the driver side door will bang into the mirror. Thus, it is desirable for the arm to be able to move when the door is moving. In other words, when the door opens, the arm moves out of the way of the door. When the door closes, the arm moves back into the position it was in before the door was opened so that the mirror can again be seen by the driver (without obstruction). One way to accomplish this goal is for the arm to be pushed out of the way by the door as the door opens. A mechanism then allows the arm to move back to its original position when the door closes. For example, the arm can be spring loaded so that spring force urges the arm back to its original position when the door closes. Alternatively, electric sensors and a motor can automatically rotate the arm back to the original position when it is detected that the door has closed. There are numerous ways to implement this basic concept as more clearly illustrated by the examples below.

An exemplary embodiment of the present invention is shown in FIG. 1. FIG. 1 illustrates mirror bracket 100. Mirror bracket includes attachment member 130. Attachment member 130 can be attached, for example, to A-pillar 940 using bolts 930 (shown in FIG. 10). This is very convenient because bolts 930 in an exemplary embodiment are already included in the vehicle and can be easily unscrewed from the vehicle and screwed back into the vehicle. It is understood, however, that attachment member 130 can be attached to the vehicle at other locations as well. Attachment of attachment member 130 to A-pillar 940 is merely an example of how an exemplary embodiment of the present invention can be practiced. Attachment member 130 includes openings 401 and 402. Thus, again referring to FIG. 10, bolts 930 can be unscrewed, attachment member 130 can be held against A-pillar 940, and bolts 930 can be screwed back into place. In this example, the location of openings 401 and 402 correspond with the location of bolts 930.

Coupled to attachment member 130 is base 120. Swivel member 110 swivels relative to base 120. In FIG. 1, swivel member 110 is illustrated as being above base 120. However, in an alternative embodiment, base 120 can be situated above swivel member 110. In the embodiment shown in FIG. 1, mirror receiver 202 is included. The mirror is attached to swivel member 110 at the location shown by mirror receiver 202. It is understood, however, that if swivel member 110 and base 120 are inverted then it may be necessary to situate mirror receiver 202 in an appropriate location to support a mirror.

In one exemplary embodiment, the mirror assembly (and mirror) is provided with the mirror bracket. In another exemplary embodiment, the mirror bracket is provided without the mirror assembly (and mirror), and the mirror assembly is attached to the mirror bracket prior to operating the mirror vehicle.

Figure 2:
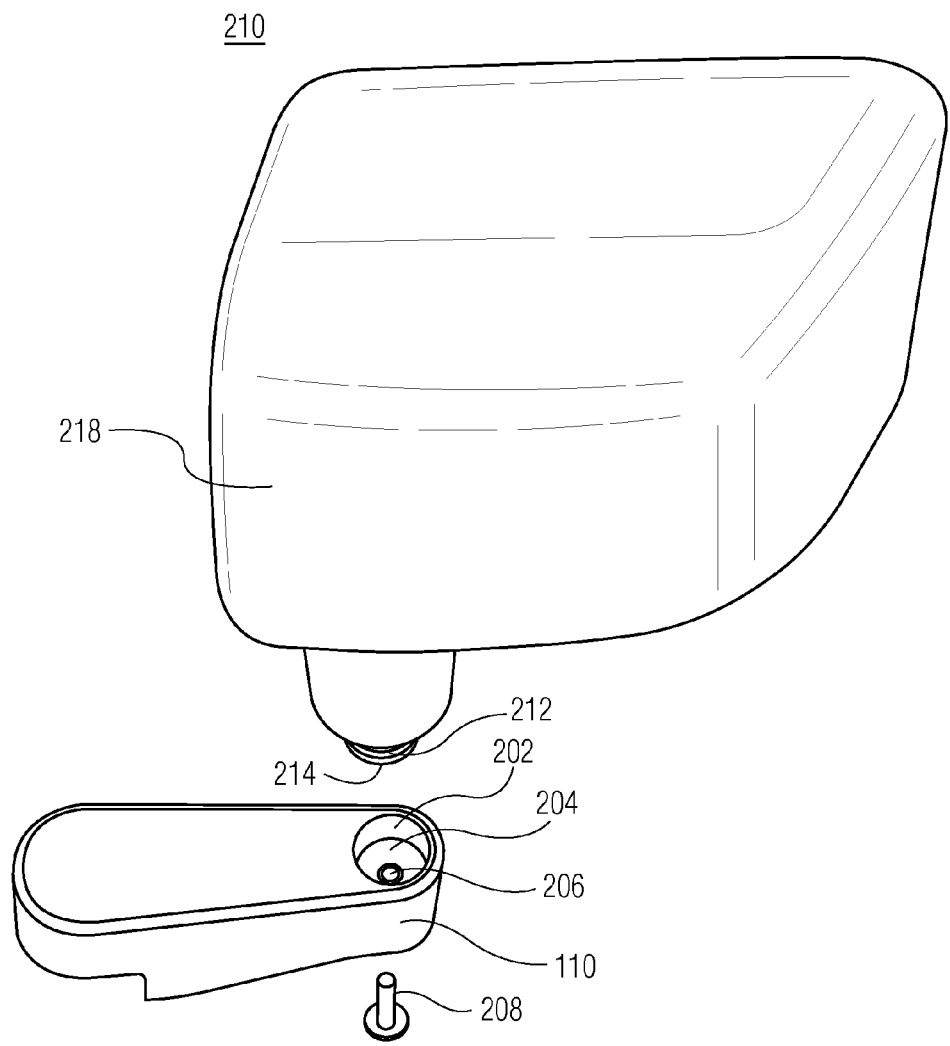
FIG. 2 shows a top perspective view of a swivel member and a mirror assembly in accordance with a first exemplary embodiment of the present invention.

FIG. 2 illustrates the relative position of mirror assembly 210 relative to swivel member 110. Mirror assembly 210 includes mirror housing 218 and mirror 216 (not shown in FIG. 2 because it is facing into the page on which the drawing appears). Mirror housing 218 includes mirror shaft 212 and threaded opening 214 (not shown because it is facing downwards on the page). In the exemplary embodiment shown in FIG. 2, mirror receiver 202 is illustrated as an orifice. However, it is understood that there are other ways to attach mirror housing 218 to swivel member 110. In the example shown in FIG. 2, opening 206 is formed in swivel member 110. Bolt 208 extends through the bottom of swivel member 110 and engages threaded opening 214 situated in mirror shaft 212. In this manner, mirror housing 218 is attached to swivel member 110. Though FIG. 2 illustrates one method of attaching mirror housing 218 to swivel member 110, it is understood that there are many other ways to attach mirror housing 218 to swivel member 110 as will be understood by one of ordinary skill in the art.

Figure 3:
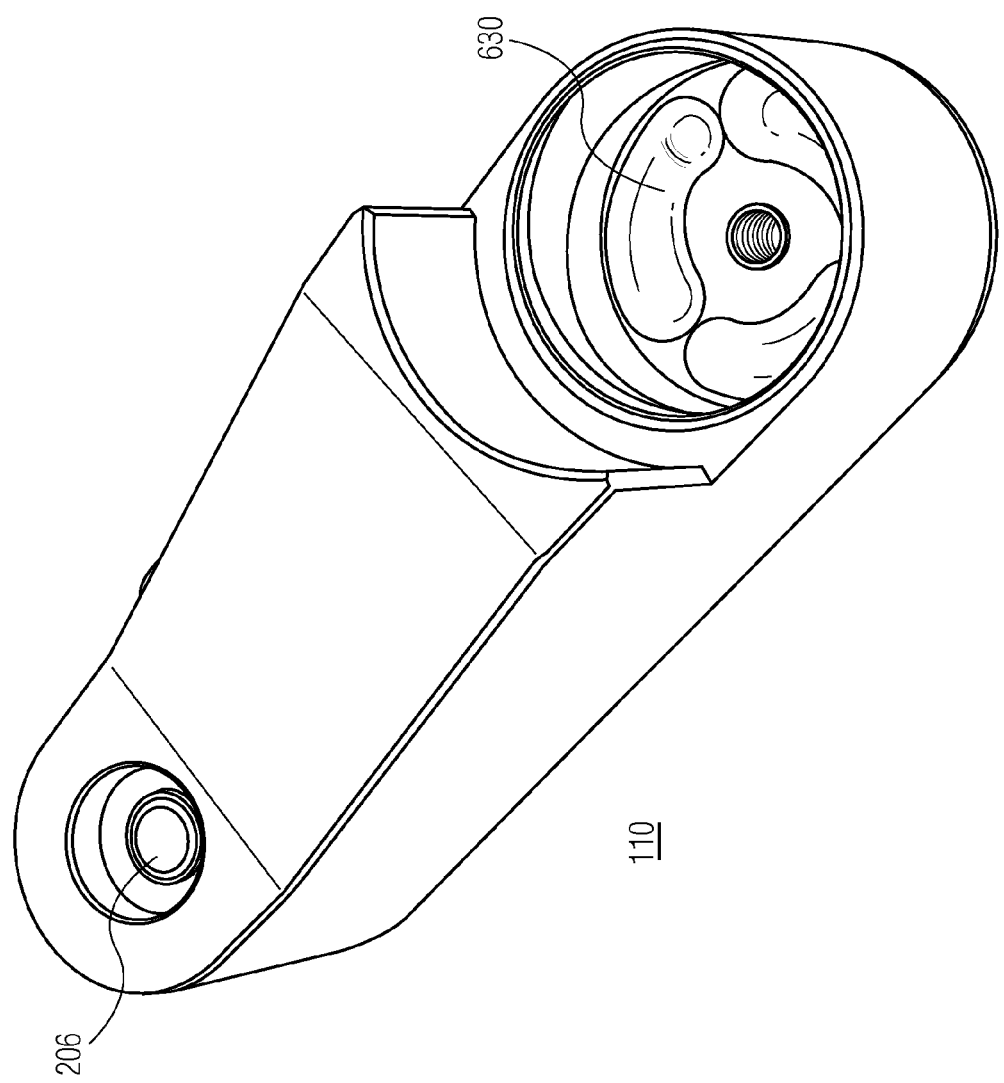
FIG. 3 shows a bottom perspective view of a swivel member and mirror assembly in accordance with a first exemplary embodiment of the present invention.

FIG. 3 illustrates swivel member 110, but the view of swivel member 110 is inverted and rotated from the view which appears in FIG. 2. Opening 206 is visible. Again, opening 206 receives bolt 208 in order to secure mirror housing 218 to swivel member 110 in accordance with an exemplary embodiment of the present invention. Grooves 630 are also shown. The purpose of grooves 630 will be described below.

Figure 4:
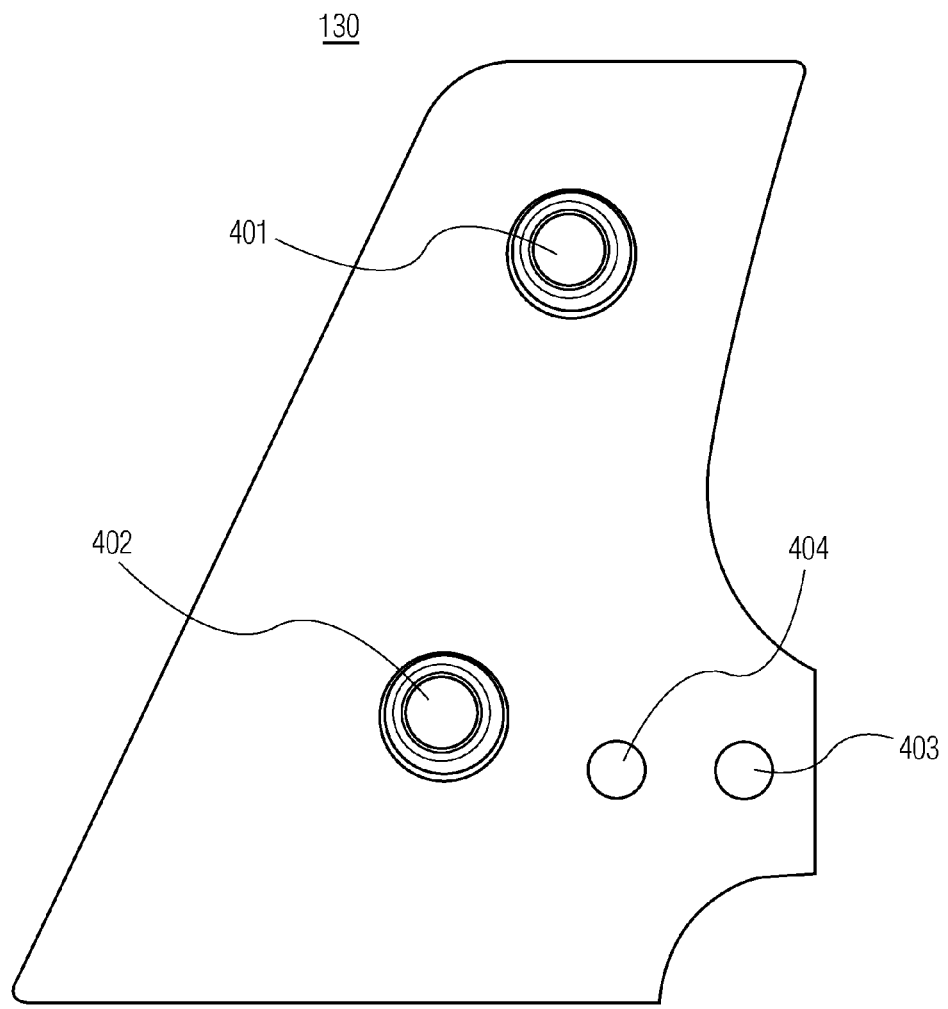
FIG. 4 shows a side view of an attachment member in accordance with a first exemplary embodiment of the present invention.

FIG. 4 is a further view of attachment member 130 which was previously shown in FIG. 1. Again, openings 401, 402 are shown. FIG. 4 also shows openings 403 and 404. Openings 403 and 404 are used for allowing bolts (not shown) to extend through attachment member 130 and into base 120. In this manner, an example is provided of how base 120 may be attached to attachment member 130.

Figure 5:
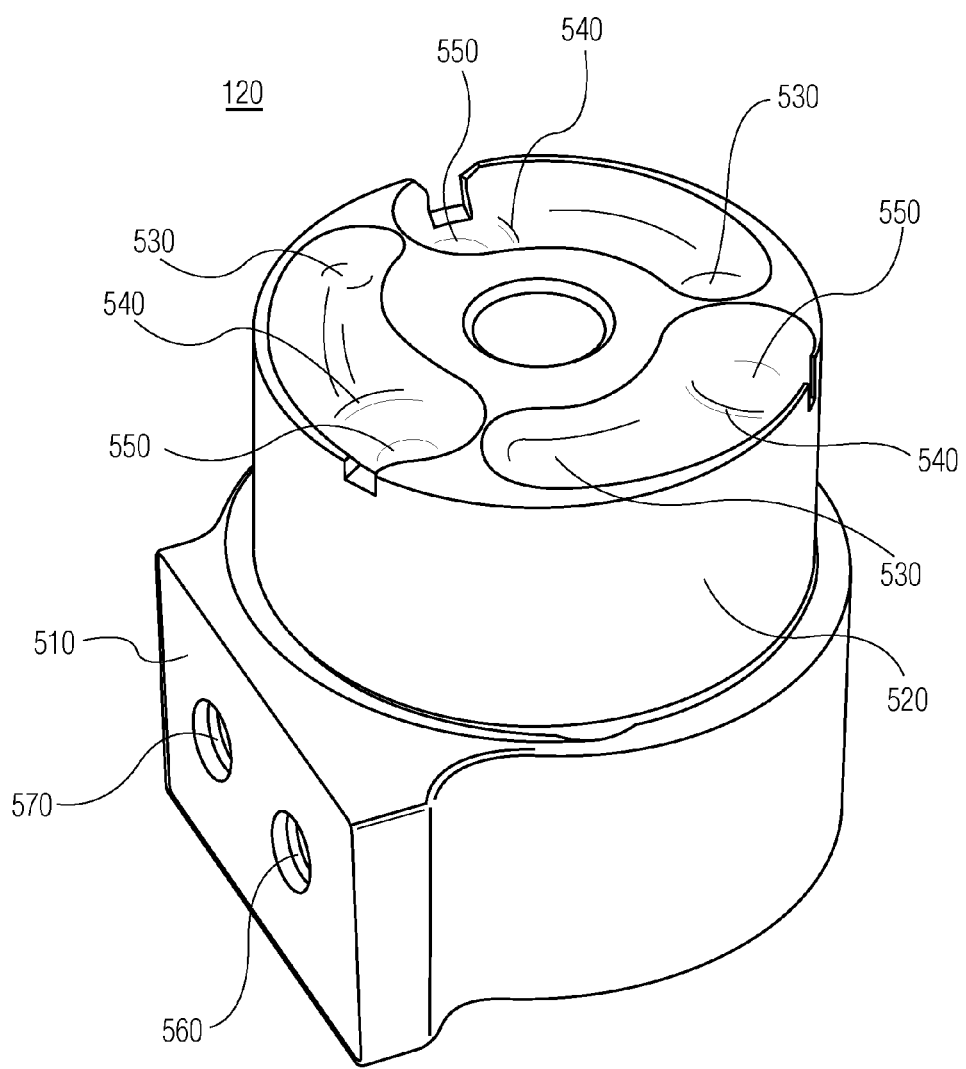
FIG. 5 shows a top perspective view of a base in accordance with a first exemplary embodiment of the present invention.

FIG. 5 illustrates base 120. Portions of base 120 which were obscured in FIG. 1 are now shown in FIG. 5. Attachment surface 510 faces attachment member 130. Openings 560 and 570 are shown. Openings 560, 570 receive bolts which extend through attachment member 130 and which are used for securing base 120 to attachment member 130. Attachment surface 520 is included. Attachment surface 520 includes grooves 530, detent edges 540 and detents 550. Steel balls 640 (not shown in FIG. 5) move within channels 530 and will be described below. While grooves 530 may have a constant depth, the depth of grooves 530 may vary going about pivot member 520. However, at detents 550, the depth of grooves 530 increases significantly. Typically, a demarcation which serves the function of being detent edge 540 is visible. The function of detents 550 will be described below.

Figure 6:
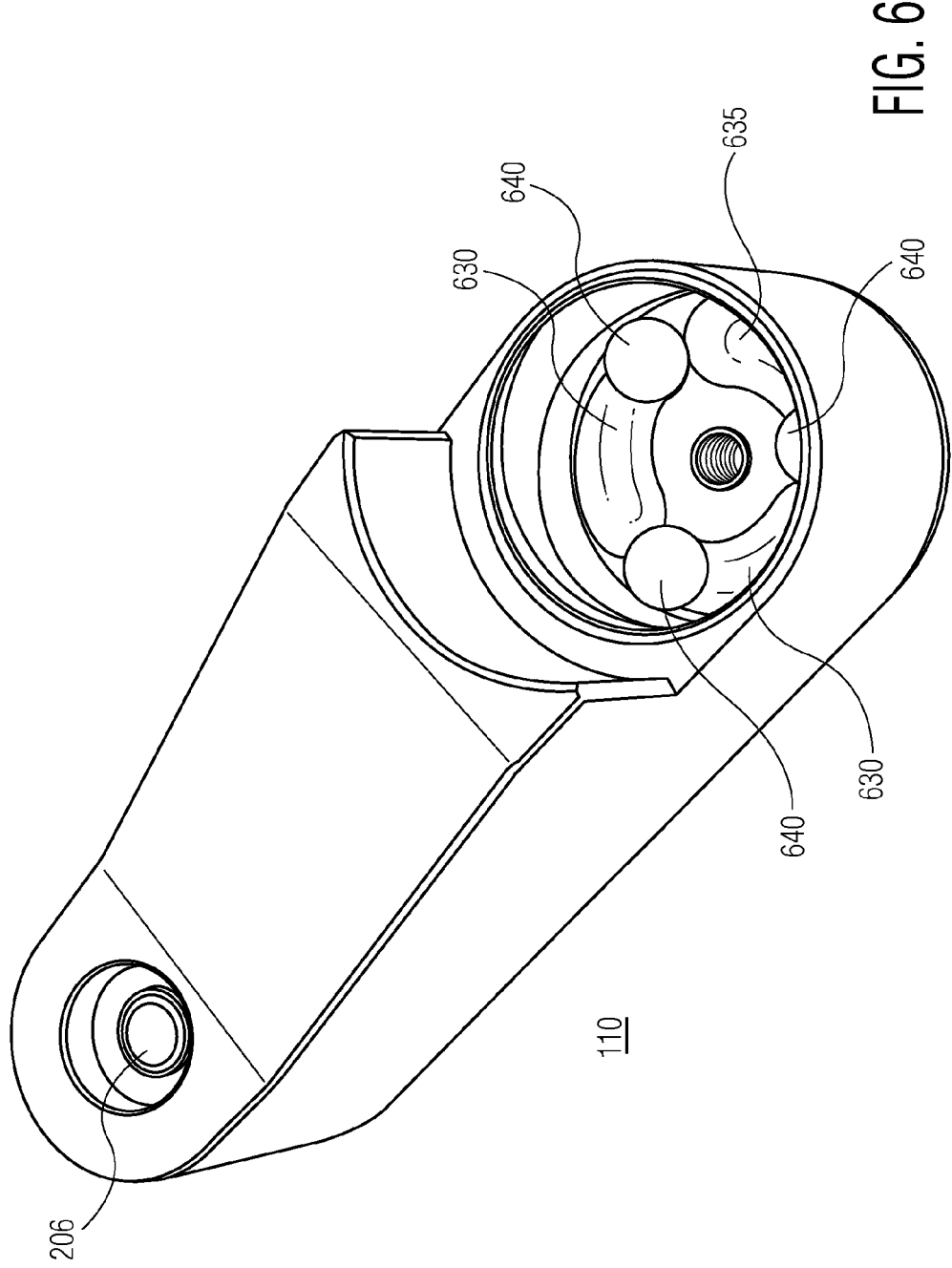
FIG. 6 shows a bottom perspective view of a base with compression balls in accordance with a first exemplary embodiment of the present invention.

FIG. 6 is another view of swivel member 110 shown in FIG. 3. However, in FIG. 6, balls 640 are also shown. These balls 640 are able to move within grooves 630. Thus, balls 640 are facing grooves 530 of base 120 shown in FIG. 5.

The combination of grooves 630, balls 640, and grooves 530 creates a spring-like device. A spring (described below) can press base 120 and swivel member 110 together. Balls 640 are held in a compressed state between grooves 630 and grooves 530. As explained below, as swivel member 110 is rotated relative to base 120, balls 640 move within grooves 630 and grooves 530. Grooves 530 and grooves 630 may be designed so that a swivel member 110 is rotated relative to base 120, and as the balls move towards detents 635 and 550, the depth of channels 630, 530 decreases. As the depth of the channels decrease, with a spring-like force is holding swivel member 110 and base 120 together, the amount of force on ball 640 will increase. Swivel member 110 will thus be urged to rotate in the opposite direction in order to reduce the amount of pressure on balls 640. This creates a spring-like rotational effect. Thus, as swivel member 110 is rotated by hand in one direction, the increased amount of force on balls 640 will cause swivel member 110 to be urged in the opposite direction. This is more further described below.

Figure 7:
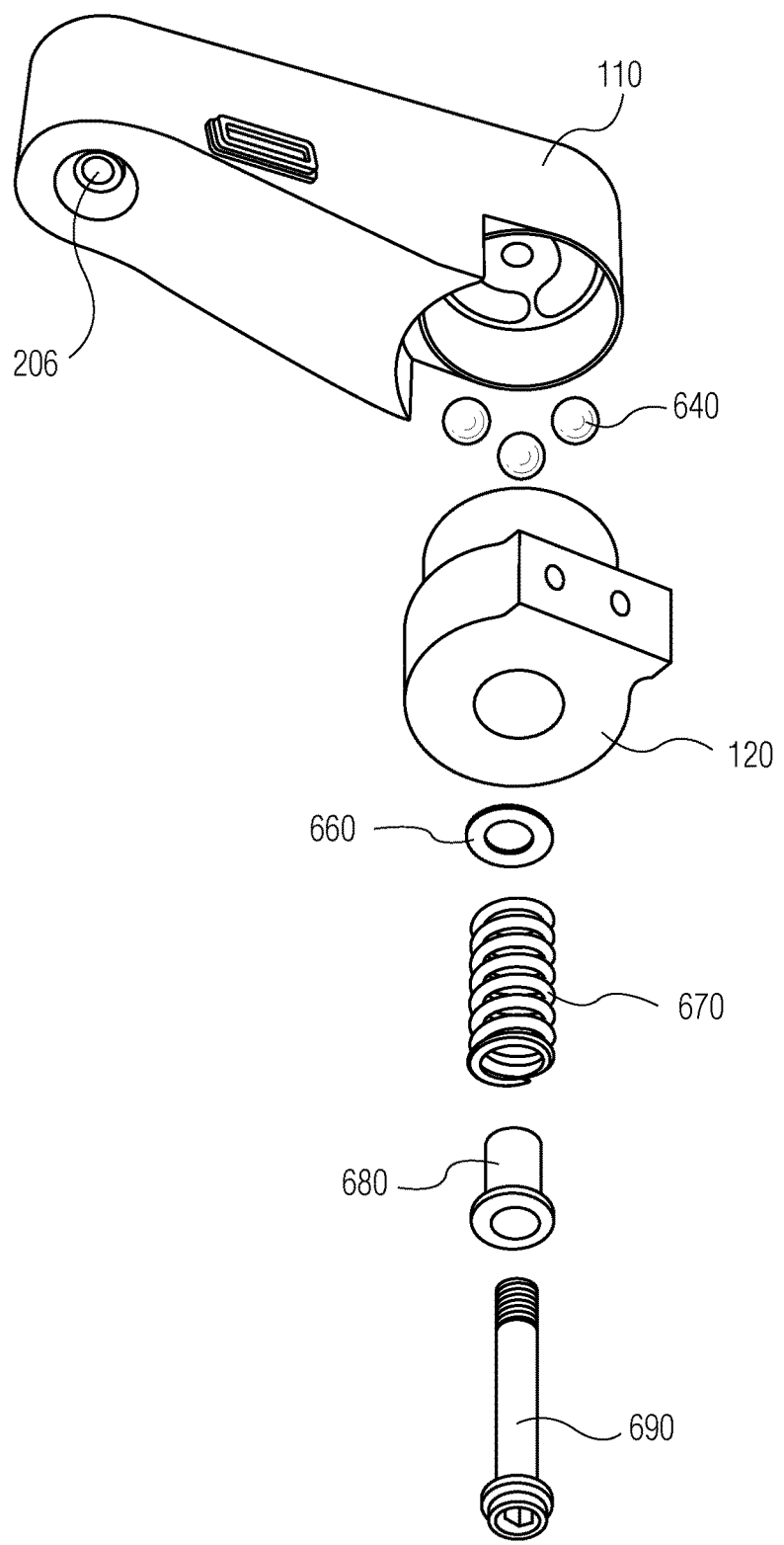
FIG. 7 shows an exploded view of the mirror bracket in accordance with a first exemplary embodiment of the present invention.

FIG. 7 is an exploded view of the first exemplary embodiment of the present invention. Screw 690 extends through protruding washer 680. Protruding washer 680 sits within spring-like member 670. Spring-like member 670 is pressed against washer 660. Washer 660 presses base 120 against swivel member 110 (as a result of the spring force that spring 670 transmits towards washer 660). Balls 640 are shown again. If the depth of the channels opposing balls 640 decreases about the axis of rotation of swivel member 110, then as swivel member 110 is rotated, the increased pressure on balls 640 causes swivel member 110 to be urged to reduce the amount of pressure on balls 640. Thus, swivel member 110 will be urged so that balls 640 tend to reside in the deepest continuous portions of groove 630.

As shown in FIGS. 5 and 6, the depth of channels 530, 630 gradually decreases and then suddenly increases at detents 550, 635. When balls 640 are in detents 550, 635, balls 640 will remain in detents 550, 635 because detents 550, 635 are the deepest portions of channels 530, 630 (compared to the portions of channels 530, 630 where balls 640 normally reside during use). Thus, as swivel member 110 is rotated about 120, swivel member 110 will tend to be urged in the opposite direction unless it is urged far enough so that balls 640 reside in detents 550, 635. At that point, the position of swivel member 110 relative to base 120 will be fixed unless force is applied against swivel member 110 to urge balls 640 out of detents 550, 635.

Figure 8A:
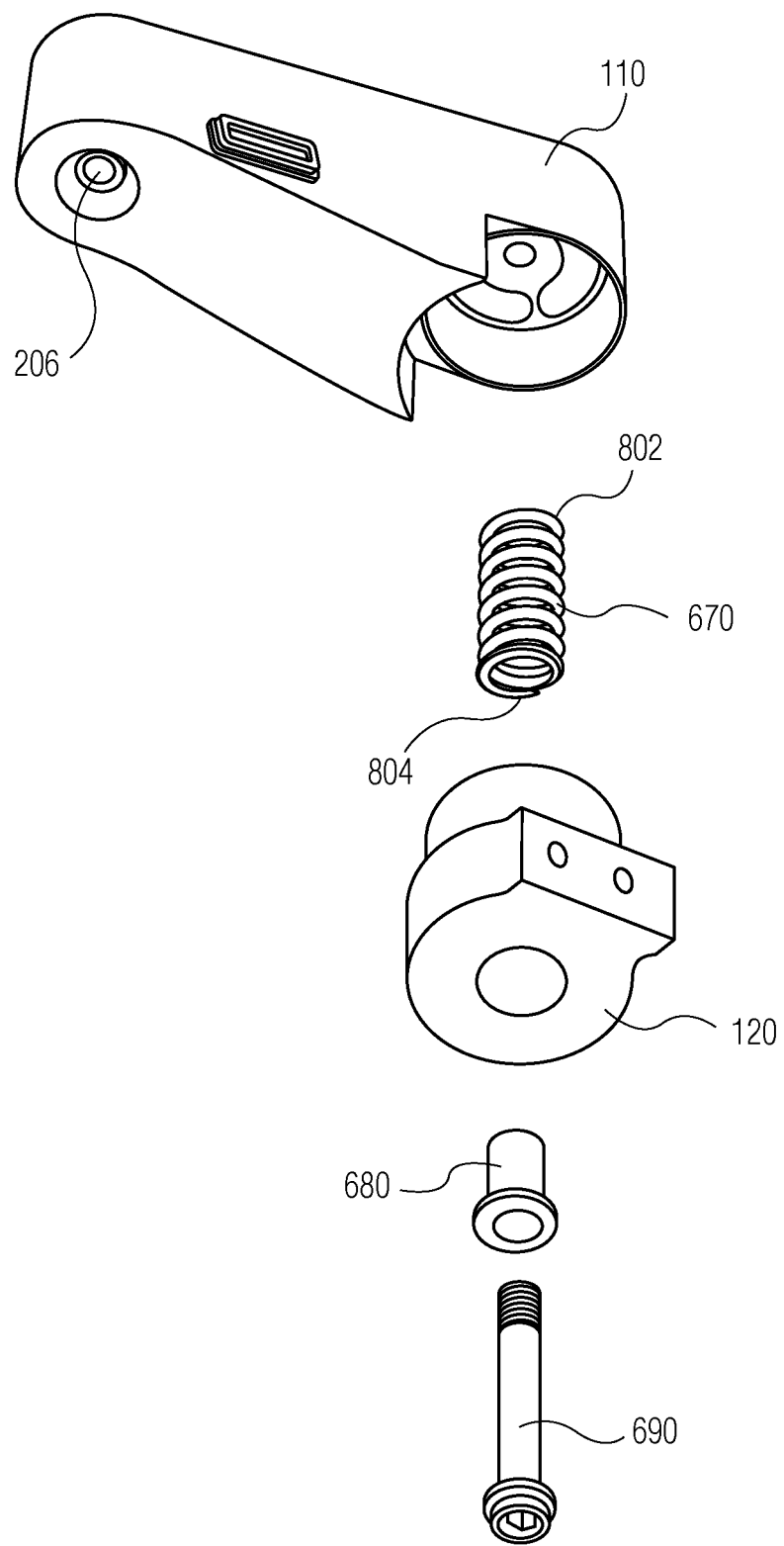
FIG. 8A shows an exploded view of a second exemplary embodiment of the present invention.

The use of balls 640 within grooves 530, 630 creates a spring-like motion between swivel member 110 and base 120. It is understood, however, that there are other ways of creating a spring-like motion between swivel member 110 and base 120. Thus, for example, FIG. 8A illustrates the use of a torsion spring in order to create spring-like motion between swivel member 110 and base 120. In the embodiment shown in FIG. 8, instead of balls and grooves, torsion spring 720 is included. Torsion spring 720 has one end 802 attached to swivel member 110 and another end 804 attached to base 120. End 802 is maintained stationary relative to swivel member 110. End 804 is maintained stationary relative to base 120. When swivel member 110 is rotated relative base 120, spring 720 is wound tighter. When swivel member 110 is released, spring 720 will unwind, urging swivel member 110 in the opposite direction to which it was wound. In other words, if swivel member 110 is rotated relative to base 120, torsion spring 720 urges swivel member 110 in a direction opposite to the direction it has been wound.

While a detent is not shown in FIG. 8A, it is understood to one of ordinary skill in the art that a detent can readily be added to the embodiment shown in FIG. 8A. In this way, swivel member 110 can be rotated relative to base 120 and temporarily locked into a position.

Thus, FIG. 8A shows an alternative embodiment of the present invention in which swivel member 110 is urged about an axis as a result of a spring-like member. It is understood to one of ordinary skill in the art, however, that there are other ways to urge swivel member 110 about base 120. For example, a linear spring (e.g. the type of spring-like member that automatically closes a storm door on the outside of the house) may be used. Using the example of a storm door, when force is used to pivot the storm door away from the house, the linear spring urges the storm door to rotate back towards the house. A similar linear spring can be used in order to urge swivel member 110 about base 120.

It is understood to one of ordinary skill in the art that there are other ways to move swivel member 110 about base 120. Other ways to accomplish this motion include motors, hydraulics, pneumatics, etc. Electronic sensors can be used to determine when swivel member 110 is to be rotated. An appropriate control system can be used to provide power (or to release an appropriate spring like member) in order to rotate swivel member 110. One of ordinary skill in the art will appreciate that there are many ways to rotate swivel member 110 about base 120.

Figure 8B:
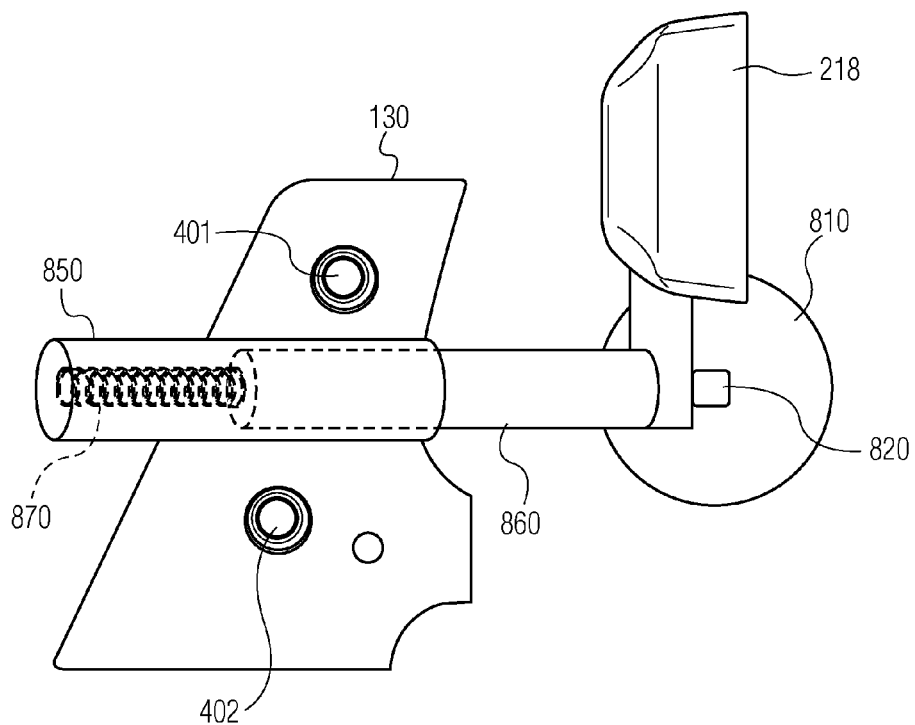
FIG. 8B shows a side view of a third exemplary embodiment of the present invention.
Figure 8C:
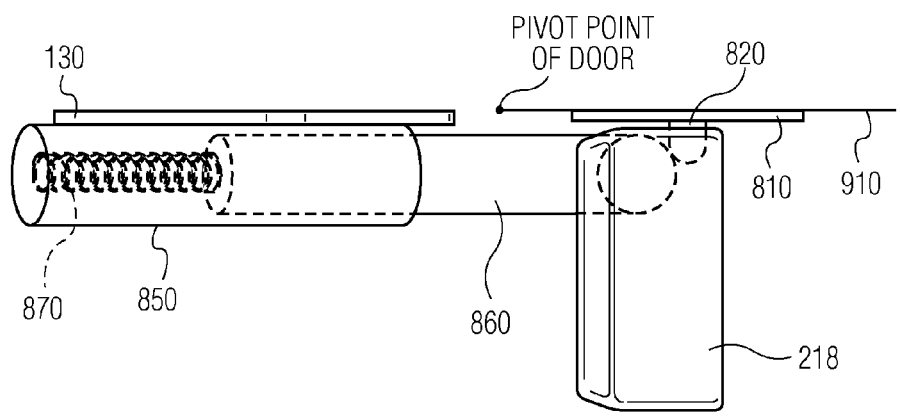
FIG. 8C shows a top view of a third exemplary embodiment of the present invention.

Another exemplary embodiment of the present invention is shown in FIGS. 8B and 8C. FIG. 8B shows a side view and FIG. 8C shows a top view. Attachment member 130 (which is attached to the vehicle) is shown. Cylinder 850 is included and is attached to attachment member 130. Piston 860 and spring member 870 are situated within cylinder 850. Mirror housing 218 is attached to the end of piston 860 which protrudes from cylinder 870. When a vehicle door is opened, the vehicle door presses (directly or indirectly) against mirror housing 218 and causes piston 860 to be pressed into cylinder 870. When a vehicle door is closed, spring 870 urges piston 860 out of cylinder 870, so that mirror housing 218 returns to a position where the mirror can easily be seen by the driver. A detent is not shown in FIGS. 8B and 8C but is readily implemented by one of ordinary skill in the art.

Figure 8D:
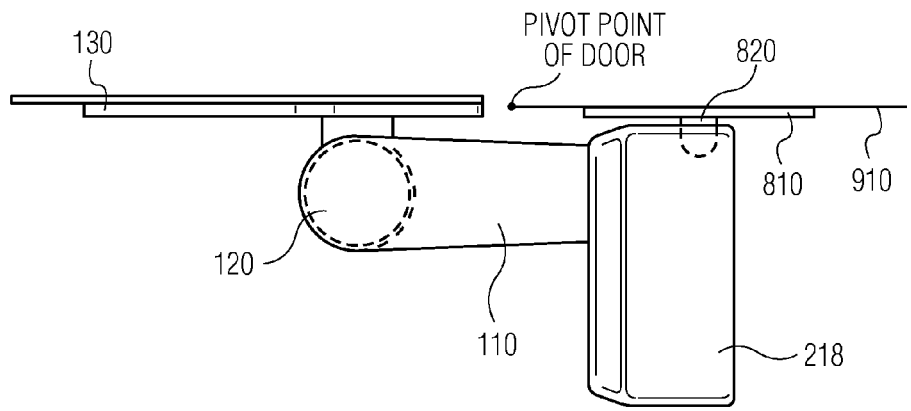
FIG. 8D shows a top view of a fourth exemplary embodiment of the present invention.
Figure 8E:
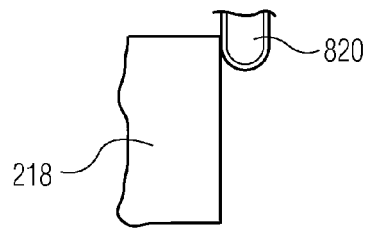
FIG. 8E show an exemplary embodiment of the present invention in which force is transferred from a protrusion to a mirror housing.
Figure 8F:
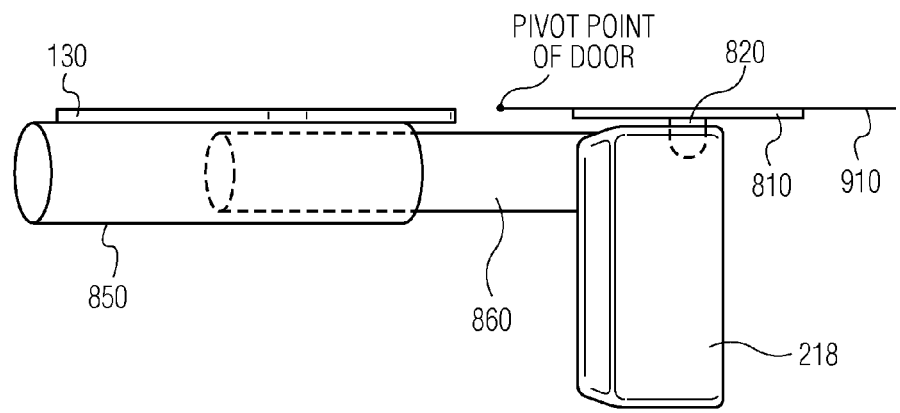
FIG. 8F shows a top view of a fifth exemplary embodiment of the present invention.

FIGS. 8D, E and F illustrate further embodiments of the present invention. The embodiments illustrated by these figures are similar to the other embodiments disclosed herein, except for the fact that spring-like motion (at least by itself) is not being relied upon to return mirror housing 218 to preferred driving position when door 910 of the vehicle is being closed. Rather, protrusion 820 and mirror housing 218 are "attached" together. When door 910 is opened, protrusion 820 applies force to mirror housing 218. In FIG. 8D, protrusion 820 applies force to mirror housing 218 so that mirror housing 218 swings with 910 away from the vehicle and mirror housing 218 pivots about base 120. When door 910 is closed, protrusion 820 pulls mirror housing 218 so that mirror housing 218 swings towards the vehicle and mirror housing 218 again pivots about 120. In FIG. 8F, protrusion 820 applies force to mirror housing 218 so that mirror housing 218 is pushed towards the front of the vehicle and piston 860 is pushed into cylinder 850. When door 910 is closed, protrusion 820 pulls mirror housing 218 so that mirror housing 218 is pulled away from the front of the vehicle and piston 860 is pulled away from cylinder 850.

When the word "attached" is used in the above paragraph, what is meant is any way for protrusion 820 to transfer force to mirror housing 218. FIG. 8E shows that there is an attachment location where force is transferred from protrusion 820 to mirror housing 218. Attachment can be accomplished using numerous methods, such as magnetics, hook and eye, nut and bolt, etc.

When door 910 is removed from the vehicle, protrusion 820 may be detached from mirror housing 218 and mirror housing 218 can be locked in place so that it does not move. One of ordinary skill in the art understands that there are numerous methods of locking mirror housing into place, including, for example, a pin/hole arrangement to prevent movement of mirror housing 218.

Furthermore, it is understood that protrusion 820 is included to prevent mirror housing from contacting and damaging door 910. It is understood that mirror housing can contact door 910 directly is an appropriate mechanism (i.e. a wheel, or some type of felt) is used to protect door 910. In that situation, magnetics, for example, can be used to "attach" mirror housing 219 to door 910.

One concept of these embodiments is that mirror housing 218 is supported on the vehicle from a place other than the door of the vehicle, and that mirror housing 218 can move with door 910 if door 910 is included in the vehicle and door 910 is opened and closed.

One concept associated with the present invention is for swivel member 110 to position mirror 216 so that it can be seen by the driver of the motor vehicle. When doors are not installed on the motor vehicle, swivel member 110 may remain in a fixed position relative to base 120 (and thus mirror 216 remains in a fixed position). However, if doors are installed in the motor vehicle, then each time the door is opened, the door will make contact with mirror housing 218. Mirror bracket thus provides a way for mirror housing 218 to be moved out of the way each time the door is opened. As the door is opened, the door pushes against mirror housing 218 and mirror housing 218 is pushed away from the position it normally occupies while the vehicle is being driven. When the door is subsequently closed, the spring like motion between swivel member 110 and base 120 causes mirror housing to move with the door. When the door is finally closed, mirror housing 218 returns to the position it occupied before the door was opened (i.e. the position it normally occupies while the vehicle is being driven).

Figure 9A:
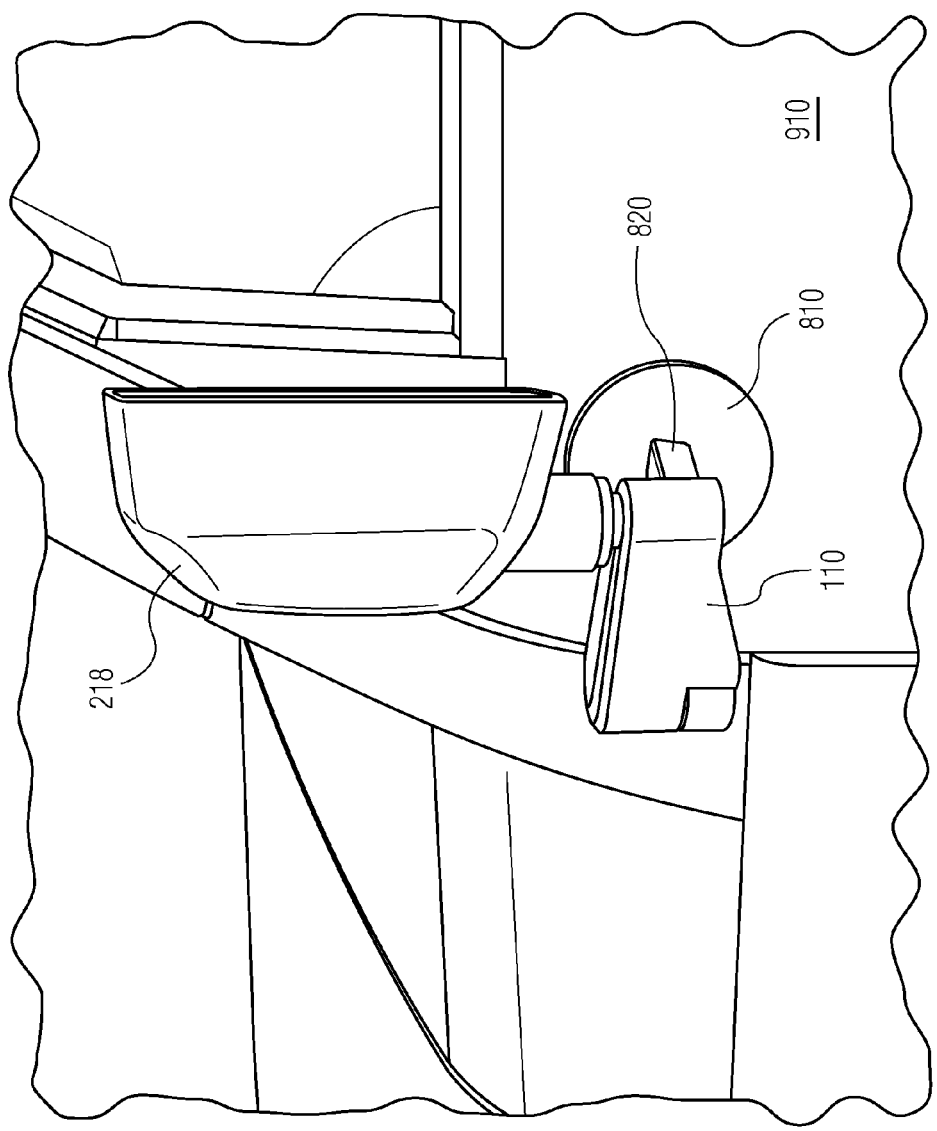
FIGS. 9A-C shows examples of motion of the mirror bracket in accordance with an exemplary embodiment of the present invention.

FIGS. 9A, B and C illustrate the motion of swivel member 110 about base member 120. In FIG. 9A, torque is urging swivel member 110 about base 120 and towards door 910. In order to prevent swivel member 110 from damaging the paint on door 910, cover plate 810 and cover plate protrusion 820 may optionally be used. Thus, the spring-like member that urges swivel member 110 about base 120 causes swivel member 110 to press against cover plate protrusion 820 (and thus against door 910).

Figure 9B:
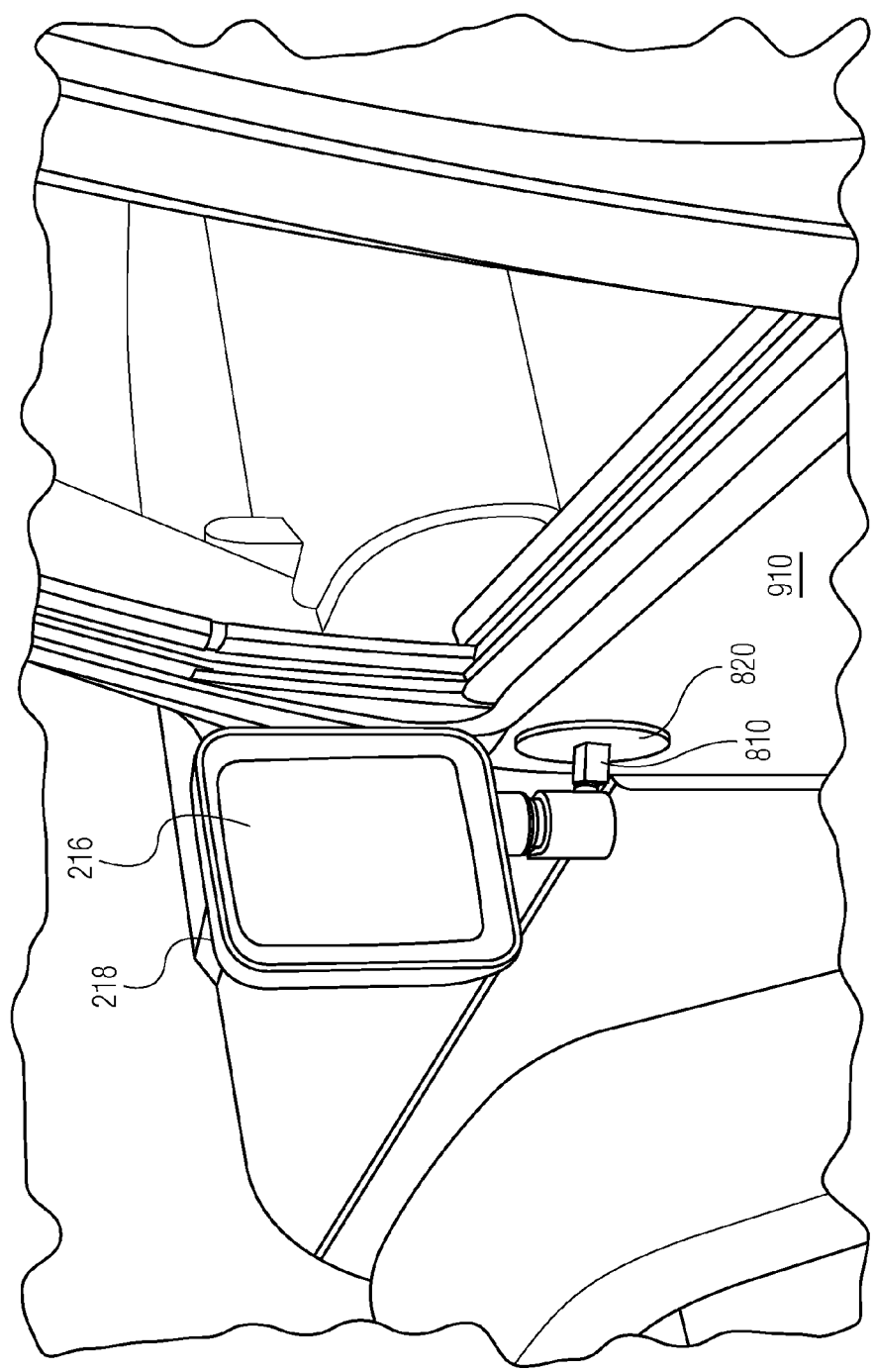

In FIG. 9B, door 910 has been partially opened. Because door 910 has been partially opened, cover plate protrusion 820 is now pushing against swivel member 110. As a result of cover plate protrusion 820 pushing against swivel member 110, swivel member 110 rotates about base 120. In this manner, mirror housing 218 moves with door 910.

If door 910 is subsequently closed, swivel member 110 will continue to be urged about base 120 so that mirror housing 218 will continue to move with door 910. Thus, as door 910 opens, swivel member 110 moves mirror housing 218 with door 910 to a position away from the position mirror housing 218 normally occupies while the vehicle is being driven. Similarly, as door 910 closes, mirror housing 218 again moves with door 910.

If door 910 is removed, mirror housing 218 can remain in the position shown in FIG. 9A. This is illustrated by FIG. 9D. In this manner, if the vehicle is driven without doors, the driver is still easily able to view mirror 216 within mirror housing 218.

Figure 9C:
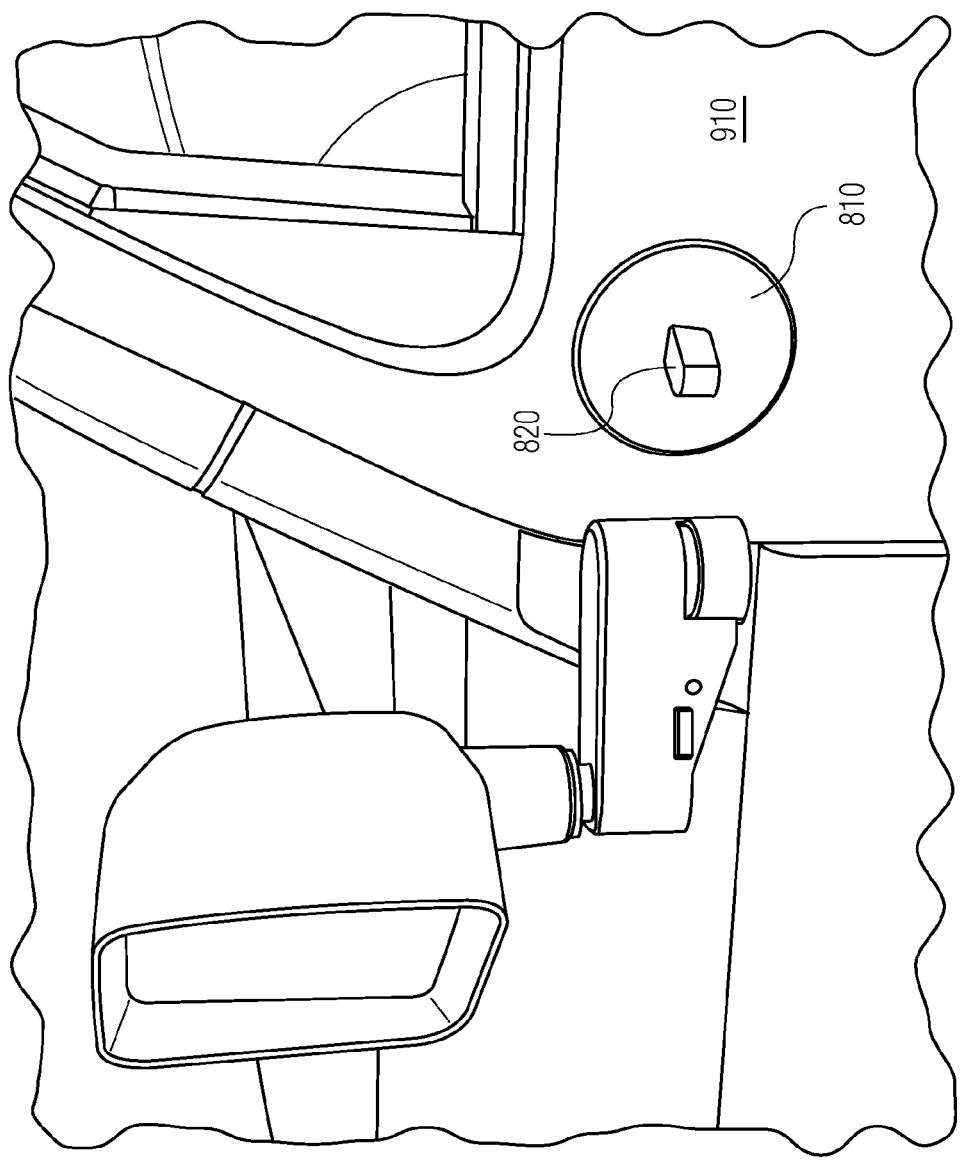

FIG. 9C shows swivel member 110 rotated relative to base 120 so that the detents are engaged. When the detents are engaged, swivel member 110 does not move with door 910. This position is helpful if one desires to remove door 910 from the vehicle. In this manner, mirror housing 218 can be swung out of the way so that door 910 can be removed. The detents maintain mirror housing 218 in the position shown in FIG. 9C. Similarly, mirror housing 218 can be moved out of the way when it is desired to reinstall door 910 on the vehicle. When the vehicle is ready to be driven (with or without door 910 installed), swivel member 110 can be pushed by hand so that the detents disengage the mirror housing 218 is again in the position shown in FIG. 9A.

Thus, as shown in FIG. 9A, the mirror is placed in a location where it is easily visible from the driver seat. Also, the mirror is able to move with the door as the door opens and closes. In addition, the mirror can be locked into the position shown in FIG. 9C if it is desired to remove the door from the vehicle or if it is desired to reinstall the door on the vehicle.

FIGS. 8B and 8C show cover plate 810 and protrusion 820. In the embodiment illustrated by those figures, as door 910 is swung open (i.e. swung about the pivot point), protrusion 820 pushes against mirror housing 218 in order to push mirror housing 218 towards the front of the vehicle. As door 910 is closed, the force of spring 870 urges mirror housing 218 back to the position where the mirror inside mirror housing 218 can be readily seen by the driver of the vehicle.

While the above description relates to embodiments that rely on spring-like features to rotate mirror housing 218, it is understood to one of ordinary skill in the art that there are other ways to move mirror housing 218. For example, a motor can be used to rotate mirror housing 218. When door 910 is opened, either mirror housing 218 can be pushed out of the way or motors can rotate mirror housing 218 out of the way (sensors can be used to sense that door 910 has been opened and the motor can be engaged responsive to the sensors). When door 910 is closed, sensors can be used to sense that door 910 has been closed and the motor can be engaged responsive to the sensors to move mirror housing 218 back to the position shown in FIG. 9A.

The exemplary embodiments described above include a rotational motion to move mirror housing 218 when door 910 is opened. It is understood, however, that there are other ways to move mirror housing 218. For example, a sliding system can be used to slide mirror housing 218 as illustrated by FIGS. 8B and 8C. As door 910 is opened, mirror housing 218 can be slid towards the front of the vehicle (and thus away from the position mirror housing 218 occupies in FIG. 9A). As door 910 is closed, mirror housing 218 can be slid towards the rear of the vehicle (and thus towards the position mirror housing 218 occupies in FIG. 9A). In this embodiment, mirror housing 218 can be pushed by door 910 towards the front of the vehicle and a spring like mechanism (or other type of mechanism including electronic mechanisms) can be used to return mirror housing 218 to the position shown in FIG. 9A.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

It will be understood that many additional changes in the details, materials, steps and arrangement of parts, which have been herein described and illustrated to explain the nature of the invention, may be made by those skilled in the art within the principal and scope of the invention as expressed in the appended claims.

I claim:

1. A mirror bracket configured for a motor vehicle and for supporting a mirror having a reflective front, a back behind the front, a first side and a second side opposite the first side, wherein the first side of the mirror and the second side of the mirror are each a) between the reflective front and the back, and b) between a top side and a bottom side of said mirror, said mirror bracket comprising:
   a base; and
   an arm which attaches to the base and supports the mirror at one end thereof, wherein the arm moves relative to said base;
   said arm moves about the base about a first axis or along the base along a second axis at another end thereof, wherein said arm a) rotates about said first axis in a first rotational direction or b) moves along said second axis in a first linear direction
   a spring-like member between the arm and the base which urges said arm to move relative to the base thus causing said arm to move with a range of motion a) about said first axis in a second rotational direction opposite to said first rotational direction; or b) along said second axis in a second linear direction opposite to said first linear direction, and which continues to urge said arm to move at an end of said range of motion while attached to said motor vehicle while said arm causes both said first side and said second side of said mirror to face away from where the arm attaches to the base about the first axis or along the second axis.

2. A mirror bracket according to claim 1, wherein said mirror bracket is attached to a portion of a motor vehicle other than a door, wherein said arm moves in said first rotational direction or in said first linear direction responsive to said door opening, and wherein said arm moves opposite said first rotation direction or first linear direction responsive to said door closing.

3. A mirror bracket according to claim 1, wherein said mirror bracket includes said mirror.

4. A mirror bracket configured for a motor vehicle and for supporting a mirror, said mirror bracket comprising:
   a stationary base; and
   an arm which supports said mirror so that a reflective surface of said mirror faces away from said stationary base and which moves said mirror relative to said stationary base, wherein,
   a) said arm rotates about a rotational axis in a first rotational direction responsive to force applied to an external surface of said arm from outside said arm; or
   b) said arm movable along a linear axis in a first linear direction responsive to said force applied to said external surface of said arm from outside said arm;
   said arm a) rotates about said rotational axis in a second rotational direction opposite to said first rotational direction responsive to elimination of said force; or b) moves along said linear axis in a second direction opposite to the first direction responsive to elimination of said force.

5. A mirror bracket according to claim 4, wherein said mirror bracket is attached to a portion of said vehicle other than said door, wherein arm moves in said first rotational direction or in said first linear direction responsive to said door opening, and wherein said arm moves opposite said first rotation direction or said first linear direction responsive to said door closing.

6. A mirror bracket according to claim 4, further comprising a spring-like member which urges said arm to rotate in said second rotational direction or move along said axis in said second direction opposite to the first direction.

7. A mirror bracket according to claim 4, wherein said mirror bracket includes said mirror.

8. A mirror bracket according to claim 4, wherein as said arm moves in said second rotational direction or in said second direction opposite to the first direction the side of the mirror faces away from where said arm is attached to said base.

9. A mirror bracket configured for a motor vehicle and for supporting a mirror having a reflective front, a back behind the front, a first side and a second side opposite the first side, wherein the first side of the mirror and the second side of the mirror are each a) between the reflective front and the back, and b) between a top side and a bottom side of said mirror, said mirror bracket comprising:
   a. a first portion which is attachable to a vehicle;
   b. a second portion which attaches to the first portion and moves relative to said first portion and which supports said mirror;
   c. said second portion movable a) relative to said first portion while said first portion remains stationary relative to said vehicle, and b) movable about a first axis in a first rotational direction responsive to an external force applied to an external surface of said second portion without moving said first portion or movable along a second axis in a first linear direction responsive to said external force applied to said external surface of said second portion without moving said first portion;
   d. said second portion moves in a second rotational direction opposite said first rotational direction or in a second linear direction opposite to said first linear direction responsive to removal of said external force;
   e. said second portion pivotable about said first axis which extends through said base or movable along said second axis which extends through said base while said second portion causes both said first side of said mirror and said second side of said mirror to face away from where the second portion attaches to the first portion about the first axis or along the second axis.

10. A mirror bracket according to claim 9, wherein said mirror bracket includes said mirror.

11. A mirror bracket according to claim 9, wherein said mirror bracket is attached to a portion of said vehicle other than said door, wherein arm moves in said first rotational direction or in said first linear direction responsive to said door opening, and wherein said arm moves opposite said first rotation direction or said first linear direction responsive to said door closing.

12. A mirror bracket configured for a motor vehicle and for supporting a mirror having a reflective front, a back behind the front, a first side and a second side opposite the first side, wherein the first side of the mirror and the second side of the mirror are each a) between the reflective front and the back, and b) between a top side and a bottom side of said mirror, said mirror bracket comprising:
- a base;
- an attachment member for attaching said base to a vehicle;
- a moving member which attaches to the base and which pivots or moves linearly relative to said base;
- a pushing member, physically separable from said moving member, which urges said moving member about said base in a first rotational direction or toward said base in a first linear direction without moving said base;
- an urging member which transmits force to rotate said moving member about said base without moving said base while said base remains stationary relative to said moving member in a second rotational direction opposite to said first rotational direction or along said base without moving said base while said base remains stationary relative to said moving member in a second linear direction opposite to said first linear direction while said base remains stationary relative to said vehicle, and wherein said moving member causes said both first side of said mirror and said second side of said mirror to face away from where the moving member attaches to the base and moves in the second rotational direction or the second linear direction;
- a mirror receiver included in said moving member to attach said mirror to said moving member.

13. A mirror bracket according to claim 12, wherein said mirror bracket includes said mirror.

14. A mirror bracket according to claim 12, wherein said urging member is a spring.

15. A mirror bracket according to claim 12, wherein said urging member is a ball detent.

16. A mirror bracket according to claim 12, wherein said moving member and said attachment member engage each other with a male/female configuration in order to maintain pivoting of said pivot member relative to said base.

17. A mirror bracket according to claim 12, wherein said urging member urges said moving member towards said vehicle.

18. A mirror bracket according to claim 12, wherein a mirror bracket stop limits pivoting of said moving member about said base.

19. A mirror bracket according to claim 18, wherein said mirror bracket stop is attached to a door of said vehicle, and said mirror bracket stop limits pivoting of said pivot member while said mirror bracket is attached to said vehicle.

20. A mirror bracket according to claim 12, wherein at least one of said moving member and said base includes a detent against which said urging member urges, to hold said moving member stationary relative to said base, wherein upon said detent being disengaged, said urging member rotates said moving member further relative to said base.

21. A mirror bracket according to claim 12, wherein said mirror bracket is attached to a portion of said vehicle other than said door, wherein arm moves in said first rotational direction responsive to said door opening, and wherein said arm moves opposite said first rotation direction responsive to said door closing.

22. A mirror bracket according to claim 12, wherein said mirror bracket includes said mirror.

23. A mirror bracket according to claim 12, wherein said mirror receiver orients a reflective surface of said mirror away from said urging member.

24. A mirror bracket according to claim 12, wherein said attachment member includes a plurality of openings where said attachment member is attached to said vehicle, an axis extends through one of said openings, and the pushing member pushes the mirror receiver away from the axis.

25. A mirror bracket attached to a side of a vehicle, wherein the side of the vehicle includes a door, the side situated between a front and a rear of said vehicle, wherein an engine for propelling said vehicle is closer to said front than to said rear of said vehicle, said mirror bracket for supporting a mirror having a reflective front, a back behind the front, a first side and a second side opposite the first side, wherein the first side of the mirror and the second side of the mirror are each a) between the reflective front and the back, and b) between a to side and a bottom side of said mirror, said mirror bracket comprising:
- a base attached to said side of said vehicle away from any door on said side of said vehicle;
- a movable member movably attached to said base,
- the mirror attached to said movable member,
- opening of said door moves said movable member and said mirror from a first position to a second position without moving said base while said back of said mirror faces towards where the movable member attaches to the base and moves about a first axis or along a second axis,
- closing of said door moves said movable member and said mirror from said second position to said first position without moving said base.

* * * * *